US012215847B1

(12) United States Patent
Yang

(10) Patent No.: US 12,215,847 B1
(45) Date of Patent: Feb. 4, 2025

(54) CONNECTION COMBINATION STRUCTURE WITH FREE-ROTATING WATERPROOF LAMP CONDUCTIVE MODULE

(71) Applicant: SMART ELECTRIC WORKS CO., LTD., Chang Hua Hsien (TW)

(72) Inventor: Jerry Yang, Taichung (TW)

(73) Assignee: SMART ELECTRIC WORKS CO., LTD., Chang Hua Hsien (TW)

( * ) Notice: Subject to any disclaimer, the term of this patent is extended or adjusted under 35 U.S.C. 154(b) by 0 days.

(21) Appl. No.: 18/420,022

(22) Filed: Jan. 23, 2024

(51) Int. Cl.

| | |
|---|---|
| ***F21V 23/06*** | (2006.01) |
| ***F21S 2/00*** | (2016.01) |
| ***F21V 21/005*** | (2006.01) |
| ***F21V 21/26*** | (2006.01) |
| ***F21V 31/00*** | (2006.01) |

(52) U.S. Cl.
CPC .............. *F21V 23/06* (2013.01); *F21S 2/005* (2013.01); *F21V 21/005* (2013.01); *F21V 21/26* (2013.01); *F21V 31/005* (2013.01)

(58) Field of Classification Search
CPC ...... F21V 21/005; F21V 21/26; F21V 31/005; F21V 23/06; F12S 2/005
See application file for complete search history.

(56) References Cited

U.S. PATENT DOCUMENTS

2014/0071668 A1* 3/2014 Ai ............................ F21S 8/00
362/217.17

FOREIGN PATENT DOCUMENTS

| | | | | |
|---|---|---|---|---|
| CN | 107690554 A * | 2/2018 | ............. F21V 17/16 |
| CN | 210831533 U * | 6/2020 | |
| CN | 112283620 A * | 1/2021 | ................ F21S 8/00 |
| DE | 202020100248 U1 * | 4/2020 | ............. F21K 9/272 |

OTHER PUBLICATIONS

Innovation q+ IP.com npl search (Year: 2024).*

* cited by examiner

*Primary Examiner* — Anabel Ton

(74) *Attorney, Agent, or Firm* — Ying-Ting Chen; Law Office of Michael Chen

(57) ABSTRACT

A connection combination structure with free-rotating waterproof lamp conductive module, which has a lamp is provided on each of multiple light poles. Each light pole has a plug-in post on one end, and a plug hole on the other end. When assembling multiple light poles, the plug-in post of one light pole is inserted into the plug hole of another light pole. Through the thread locking and axial positioning structure of the plug-in post and plug hole, each light pole is axially locked and can rotate 360 degrees in the circumferential direction, and cannot be directly pulled out axially, and the conductive terminals in the plug-in post and plug hole conduct to each other. In this way, light poles can rotate with each other to adjust lamp illumination direction, and the connection structure of multiple light poles also has the functions of electrical connection and waterproofing.

11 Claims, 10 Drawing Sheets

CONNECTION COMBINATION STRUCTURE WITH FREE-ROTATING WATERPROOF LAMP CONDUCTIVE MODULE

BACKGROUND OF THE INVENTION

1. Field of the Invention

The present invention relates to the technical field of lamps, in particular to a connection combination structure with free-rotating waterproof lamp conductive module, which can butt together the light poles of multiple lamps to form an electrical connection and assembly structure, so that multiple lamps can be arranged together and can be rotated to adjust their illumination direction, and can be used as spotlights or track lights.

2. Description of the Related Art

Today's spotlights have many structural styles and types. For example, as shown in U.S. Pat. No. 4,814,955A and USD0703359S, they have a lamp holder and a lamp combined with the lamp holder, which can adjust the illumination direction of the lamp. During its installation, multiple spotlights are usually arranged and fixed on the ceiling or beams, so that the light of the lamps is projected onto the wall or other directions. However, during installation, you need to pull the wires to each spotlight one by one and try to hide the wires, which causes trouble and inconvenience during installation. Another example is the spotlight shown in U.S. Pat. No. 9,297,524B2 and USD0779696S, which implements a light pole and a plurality of spotlights combined on the light pole. However, the light pole cannot be rotated to adjust the direction of the spotlights, and can only be adjusted from the positions of the spotlights.

An existing track light has the same function as a spotlight. For example, as shown in U.S. Pat. No. 9,291,338B2, it has a power supply track and a plurality of lamps combined with the power supply track, so the positions of the lamps can be moved on the power supply track. This kind of power supply track usually cannot be assembled in sections, nor can it be rotated to adjust the illumination direction of the lamps. In addition, there is a track light with electrical connection technology for electrically connecting multiple sections of track, such as shown in U.S. Pat. No. 6,093,037A. However, its assembly structure and assembly steps are quite complicated and cumbersome, which is not conducive to quick docking of multiple sections of track lights. During assembly, it is also impossible to adjust the illumination direction of the lamps by rotating the track.

To this end, how to provide a lighting fixture that can connect multiple sections of light poles together one by one, can complete the assembly and electrical connection of multiple sections of light poles at the same time, and can also rotate the light pole to adjust the illumination direction of the lamps on each section of the light pole, which is the problem to be overcome by the present invention.

SUMMARY OF THE INVENTION

The main object of the present invention is to provide a connection combination structure with free-rotating waterproof lamp conductive module, which has an axially protruding plug-in post and an axially recessed plug hole respectively located at both ends of each of light poles. During assembly, insert the plug-in post of one light pole into the plug hole of another light pole. Through the thread and axial positioning structure, the two light poles are in a 360-degree idling state with each other. At the same time, they are axially locked to each other without axial separation, and the conductive terminals in the plug-in post and plug hole conduct to each other. In this way, multiple light poles can rotate in circumferential directions with each other to adjust the illumination direction of the lamp, and the connection structure of multiple light poles also has the function of electrical connection.

Another object of the present invention is to provide a connection combination structure with free-rotating waterproof lamp conductive module, in which the light poles are respectively implemented as a tube body. Each light pole has a first electrical connector on one end and a second electrical connector on the other end. The first electrical connector has the plug-in post, and the second electrical connector has the plug hole. In this way, multiple light poles can be connected together through the first and second electrical connectors, so that any number of light poles can be assembled, and the lamps on each light pole can be rotated and adjusted for further application as spotlights or track lights.

Still another object of the present invention is to provide a connection combination structure with free-rotating waterproof lamp conductive module, which is provided with a first positioning portion on the outer wall of the plug-in post. The first positioning portion is a positioning protrusion that protrudes from the circumferential surface, allowing the positioning protrusion to elastically shrink and deform in the radial direction. Moreover, a second positioning portion is provided on the inner hole wall of the plug hole. The second positioning portion is a positioning groove surrounding the inner hole wall, thereby achieving the functions of axial detent positioning and guiding rotation.

Still another object of the present invention is to provide a connection combination structure with a free-rotating waterproof lamp conductive module, which has a waterproof structure provided on the joint between the first electrical connector and the second electrical connector to prevent water from penetrating from the joint, so that the lighting lamp can be used as a waterproof outdoor lamp.

DETAILED DESCRIPTION OF THE PREFERRED EMBODIMENTS

Figure 1:
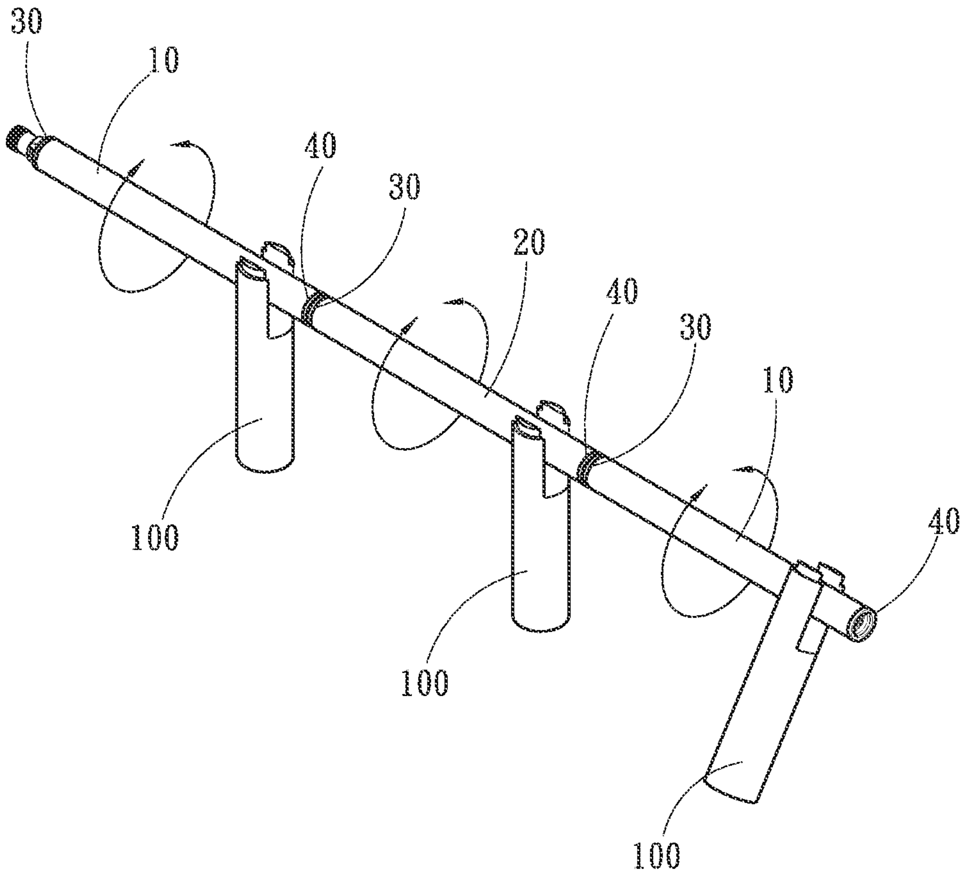
FIG. 1 is a three-dimensional schematic diagram of the connection combination structure with free-rotating waterproof lamp conductive module of the present invention.
Figure 2:
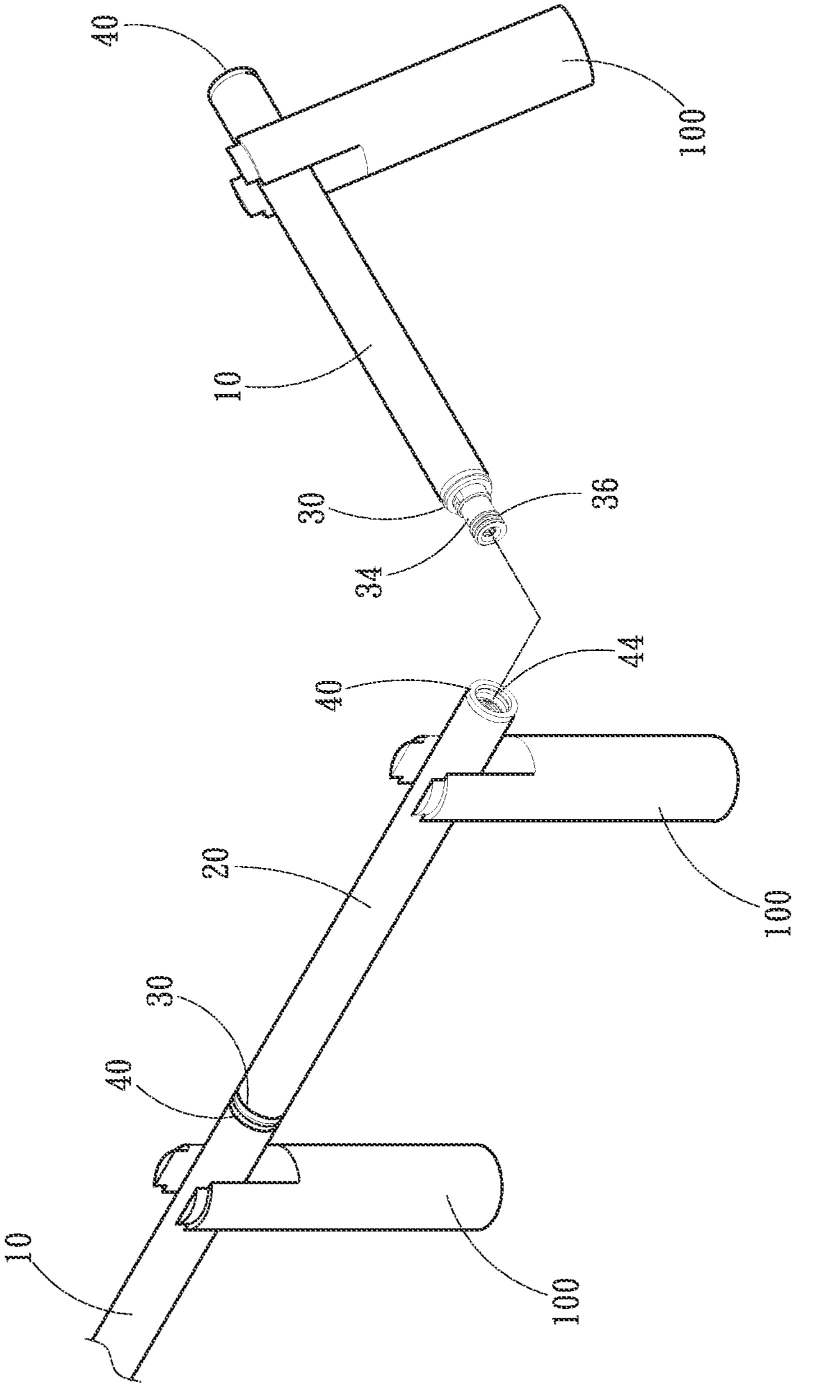
FIG. 2 is an exploded schematic diagram of the connection combination structure with free-rotating waterproof lamp conductive module of the present invention.

Referring to FIG. 1 to FIG. 2, the invention is a connection combination structure with free-rotating waterproof lamp conductive module, which can be used as spotlights or have functions similar to track lights. The preferred embodiment comprises a plurality of light poles 10, 20 that can be docked with each other, and a plurality of lamps 100 combined on the selected light poles. The lamps 100 can be an LED lamps or a lamp composed of other light-emitting components. The following only takes the structure of two light pole 10 and 20 as an example, which comprises a first light pole 10 and a second light pole 20, and lamps 100 arranged on the first light pole 10 and/or the second light pole 20.

The first light pole 10 is preferably implemented as a circular or square tube body, and the first end of the first light pole 10 is provided with an axially protruding plug-in post 34. The plug-in post 34 is a cylinder made of insulating material. A terminal hole 35 is recessed at the end of the plug-in post 34. An axially extending first conductive terminal 32 is provided in the terminal hole 35. The outer circumferential wall of the plug-in post 34 has an external thread portion 36 and at least one first positioning portion 37. The second light pole 20 is preferably implemented as a circular or square tube. The second end of the second light pole 20 is axially recessed with a plug hole 44, and the plug hole 44 is a round hole made of insulating material. The plug hole 44 is provided with a second conductive terminal 42. The inner hole wall of the plug hole 44 is sequentially provided with a second positioning portion 45, a section of internal thread portion 46 and a section of optical hole portion 47, and the diameter of the optical hole portion 47 is larger than the diameter of the internal thread portion 46 and the diameter of the external thread portion 36 of the plug-in post 34.

Figure 3:
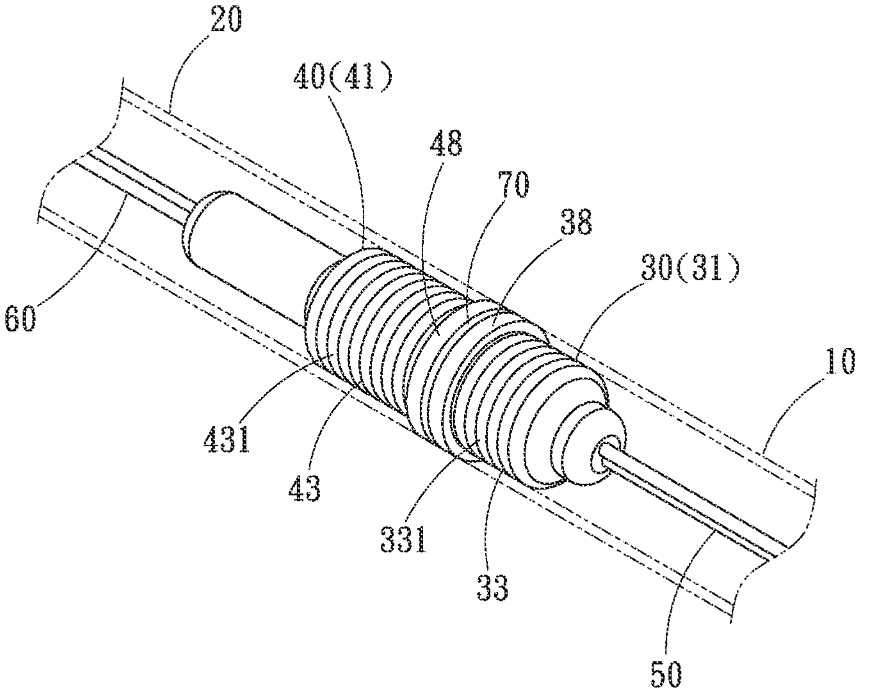
FIG. 3 is a schematic diagram of the combination of the first electrical connector and the second electrical connector according to the first embodiment of the present invention.
Figure 4:
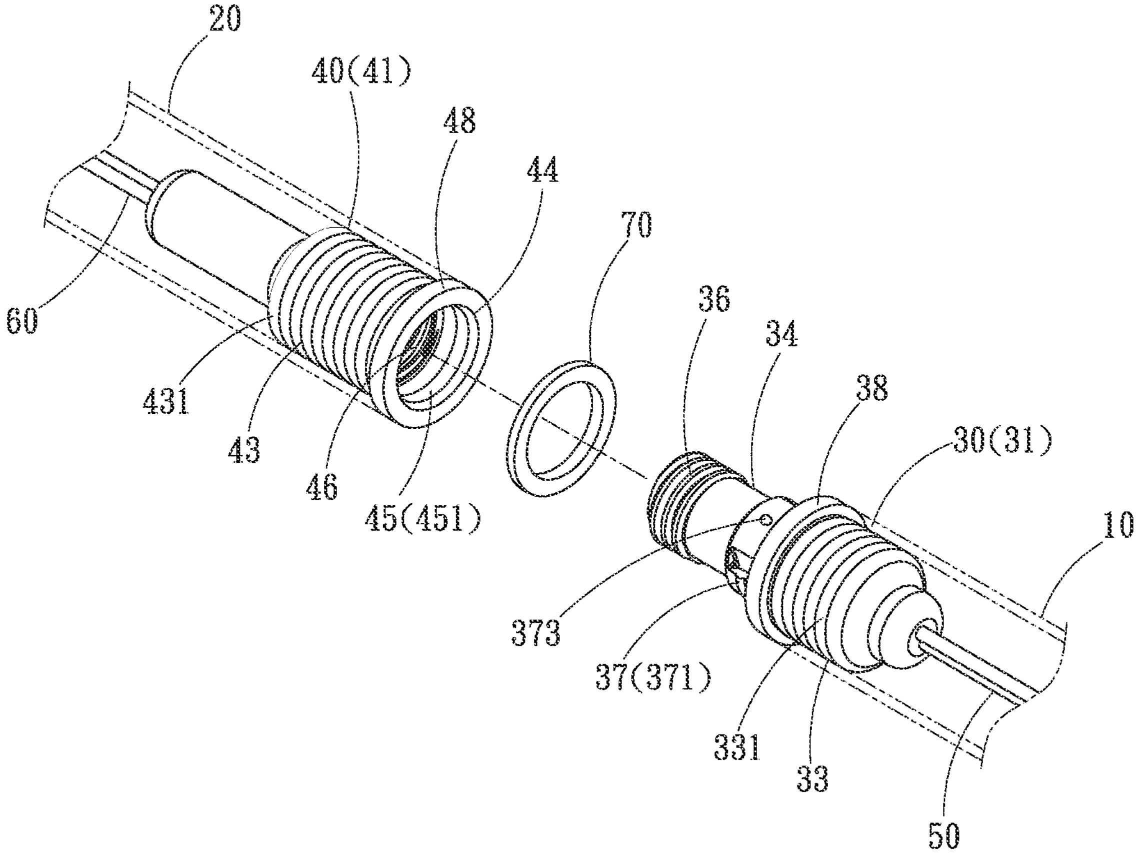
FIG. 4 is an exploded schematic diagram of the first electrical connector and the second electrical connector according to the first embodiment of the present invention.
Figure 5:
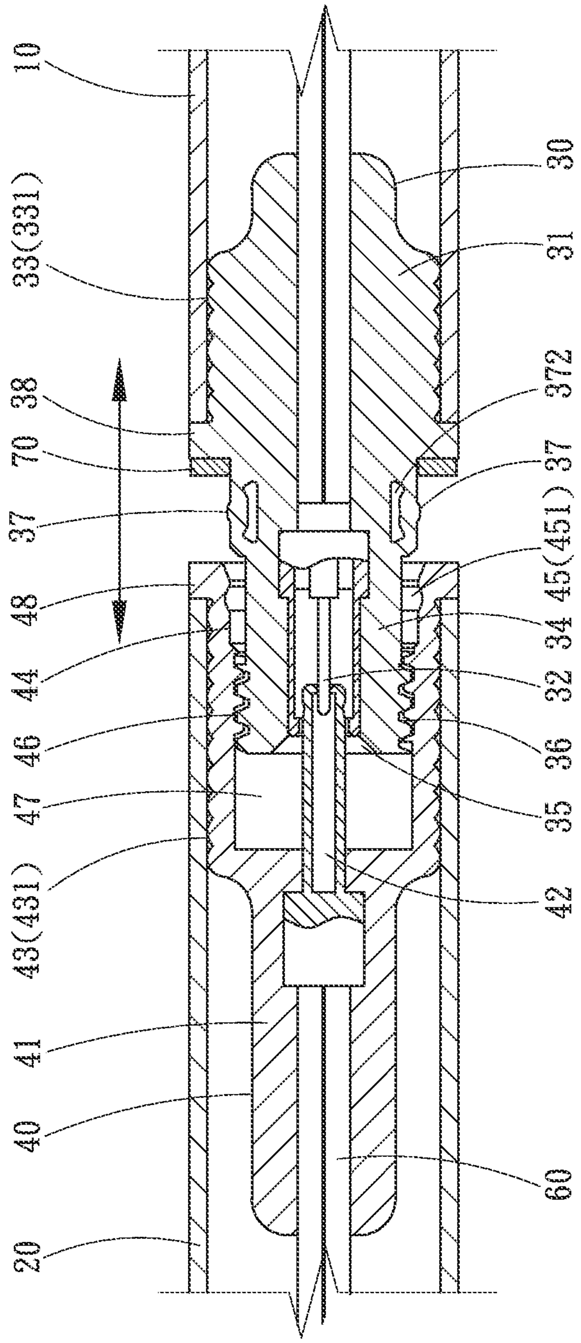
FIG. 5 is an exploded action diagram of the first electrical connector and the second electrical connector according to the first embodiment of the present invention.
Figure 6:
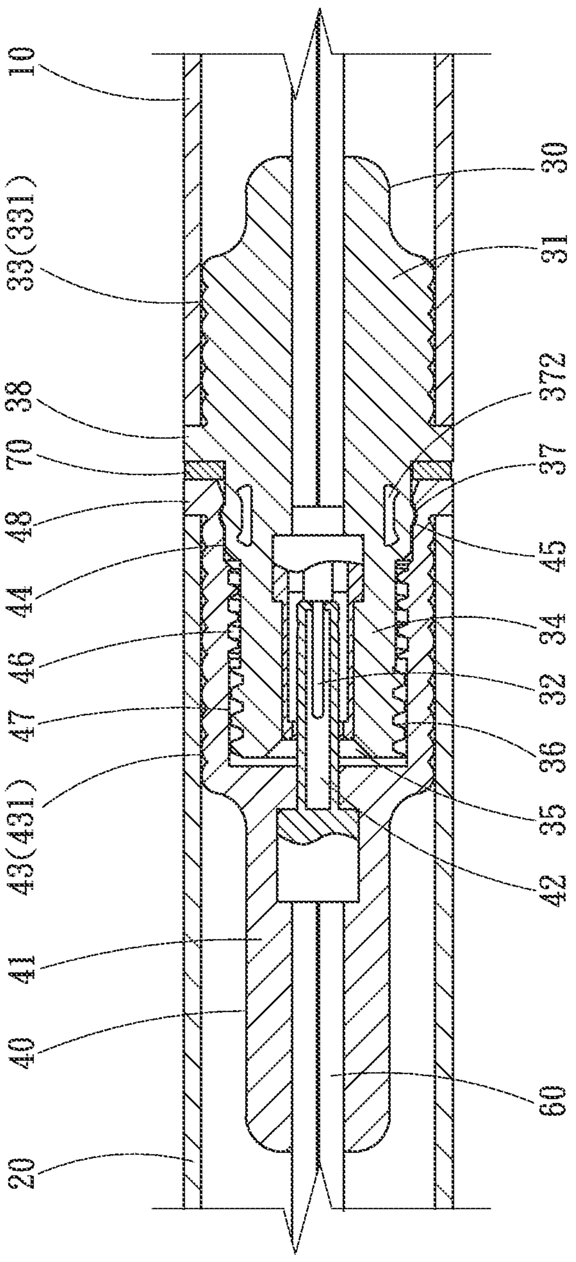
FIG. 6 is a schematic cross-sectional view of the first embodiment of the first electrical connector and the second electrical connector of the present invention.

Referring to FIGS. 3 and 4, during assembly, insert the plug-in post 34 of the first light pole 10 into the plug hole 44 of the second light pole 20, and rotate the first light pole 10 and the second light pole 20 so that the external thread portion 36 is locked into the internal thread portion 46 (as shown in FIG. 5). Continue to rotate the first and second light poles 10 and 20 until the external thread portion 36 passes the internal thread portion 46 and then enters the optical hole portion 47 (as shown in FIG. 6), forming that the first and second light poles 10 and 20 can rotate in the circumferential direction to adjust the illumination direction of the lamps 100. The external thread portion 36 will only idle when the optical hole portion 47 rotates, and will not cause the first and second light poles 10 and 20 to detach in the opposite direction. And when the external thread portion 36 of the plug-in post 34 is located at the optical hole portion 47 in the plug hole 44, the above-mentioned first positioning portion 37 and the second positioning portion 45 are locked with each other to form axial positioning (as shown in FIG. 6), and the first conductive terminal 32 and the second conductive terminal 42 are connected to each other for supplying power to the above-mentioned lamp 100.

Referring to FIG. 4, FIG. 5, FIG. 7 and FIG. 8, one of the preferred embodiments of the plug-in post 34 of the present invention is that a first electrical connector 30 is provided at the first end of the first light pole 10. The first electrical connector 30 has a first insulator 31, and the first conductive terminal 32 is disposed in the first insulator 31. The first insulator 31 forms a first connecting post 33, and the plug-in post 34 protruding from the front end of the first connecting post 33. The terminal hole 35 is recessed at the end of the plug-in post 34 for setting the first conductive terminal 32. The rear end of the first conductive terminal 32 is connected to an electrical wire 50, and the electrical wire 50 extends out of the rear end of the first electrical connector 30 through the first connecting post 33. When the first electrical connector 30 is assembled on the first light pole 10, insert the first connecting post 33 at the rear end into the first end of the tube body of the first light pole 10, so that the plug-in post 34 protrudes from the first end of the first light pole 10, and the electrical wire 50 penetrates the tube body of the first light pole 10 for electrical connection with the lamp 100.

Referring again to FIG. 4 and FIG. 5, one of the preferred embodiments of the plug hole 44 of the present invention is shown. A second electrical connector 40 is provided at the second end of the second light pole 20. The second electrical connector 40 has a second insulator 41, and the second conductive terminal 42 is disposed in the second insulator 41. The second insulator 41 has a second connecting post 43. The front end of the second connecting post 43 is recessed with the plug hole 44, and the second conductive terminal 42 is fixed in the plug hole 44. The rearend of the second conductive terminal 42 is connected to an electrical wire 60, and the electrical wire 60 extends out of the rear end of the second electrical connector 40 through the second connecting post 43. When the second electrical connector 40 is assembled on the second light pole 20, insert the second connecting post 43 into the second end of the tube body of the second light pole 20, so that the plug hole 44 is located at the second end of the second light pole 20, and the electrical wire 60 is passed through the tube body of the second light pole 20 for electrical connection with another lamp 100 or a power source.

Similarly, in the present invention, the second end of the first light pole 10 is further provided with a second electrical connector 40, and the first end of the second light pole 20 is further provided with a first electrical connector 30. Therefore, as shown, multiple first and second light poles 10 and 20 can be combined with the above-mentioned plug-in structure to form a structure in which all the internal electrical wires 50 and 60 are connected in series, and the lamps 100 on the first and second light poles 10 and 20 are connected in parallel to the electrical wires 50 and 60 in series, which can supply power to each lamp 100. Moreover, each of the first and second light poles 10 and 20 can be rotated to adjust the illumination direction of the respective lamp 100.

Figure 7:
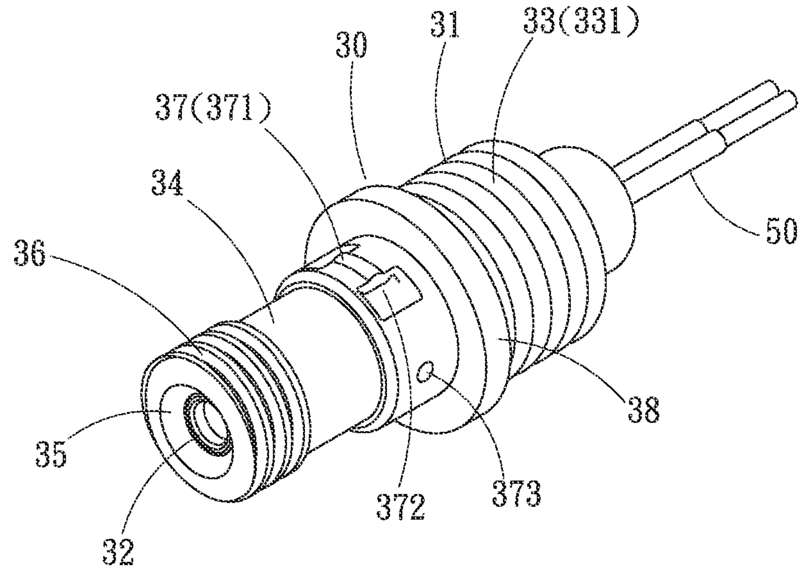
FIG. 7 is a schematic three-dimensional view of the front end of the first electrical connector according to the first embodiment of the present invention.
Figure 8:
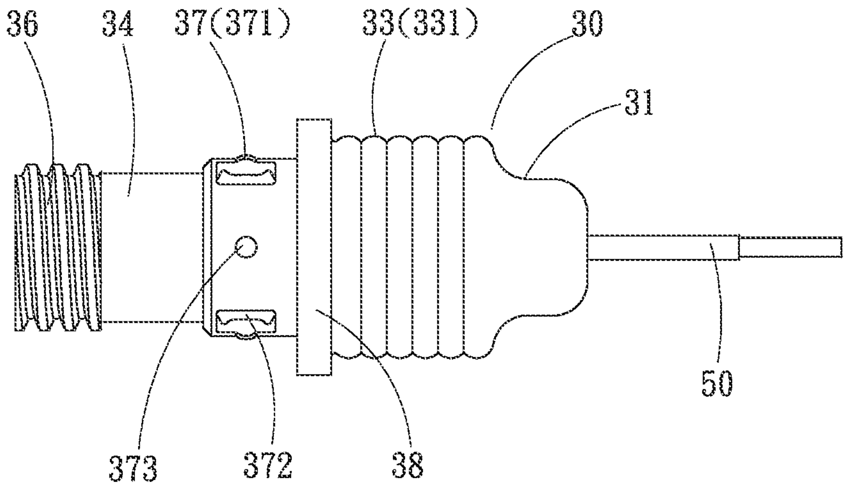
FIG. 8 is a schematic front view of the first electrical connector according to the first embodiment of the present invention.

Referring to FIG. 7 and FIG. 8, the first positioning portion 37 of the first electrical connector 30 is preferably a positioning protrusion 371 protruding from the circumferential surface of the plug-in post 34. The positioning protrusion 371 extends along the circumferential direction, and the plug-in post 34 is provided with a cavity 372 located below the positioning protrusion 371, so that the positioning protrusion 371 can more elastically shrink and deform in the radial direction. The above-mentioned second positioning portion 45 of the second electrical connector 40 is a positioning groove 451 that surrounds the inner hole wall of the plug hole 44. Therefore, when the plug-in post 34 and the plug hole 44 are assembled together with the above structure, the positioning protrusion 371 is locked in the positioning groove 451 to form axial positioning, so that when the first and second light poles 10 and 20 rotate, ensure that the external thread portion 36 only rotates in the optical hole portion 47, and the external thread portion 36 will not bite the internal thread portion 46, causing the first and second light poles 10 and 20 to be separated during rotation. When the first and second light poles 10 and 20 are to be separated, first pull the first and second light poles 10 and 20 axially to make the positioning protrusion 371 break away from the positioning groove 451, and then rotate the first and second light poles 10 and 20 to reverse separation. Furthermore, the preferred embodiment of the first positioning portion 37 also comprises a positioning bump 373 protruding from the circumferential surface of the plug-in post 34. The positioning bump 373 can also be locked in the positioning groove 451, which can enhance the axial positioning. function.

Referring to FIG. 4 and FIG. 5, the front ends of the first connecting post 33 of the first electrical connector 30 and the second connecting post 43 of the second electrical connector 40 form flanges 38 and 48 respectively. The flanges 38 and 48 can block the front ends of the tube bodies of the first and second light poles 10 and 20 respectively. Moreover, the plug-in post 34 can be further provided with an anti-leakage ring 70, and the anti-leakage ring 70 is against the front end of the first connecting post 33. The flange 38 at the front end of the first connecting post 33 and the flange 48 at the front end of the second connecting post 43 clamp the anti-leakage ring 70 (as shown in FIG. 6), thereby forming a leak-proof structure to prevent water from penetrating between the first and second electrical connectors 30 and 40. This achieves waterproof function and allows the lamps to be installed outdoors.

Figure 9:
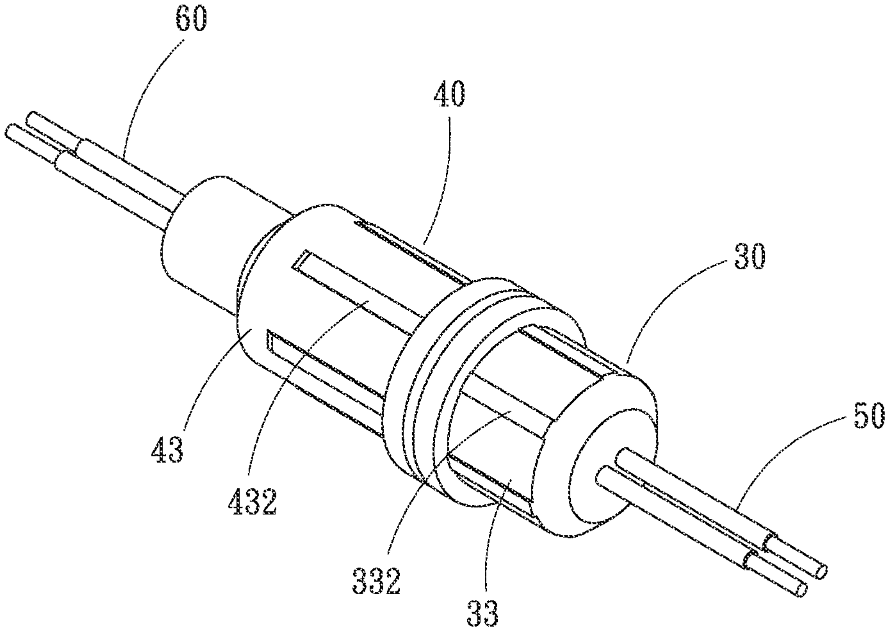
FIG. 9 is a schematic diagram of the combination of the first electrical connector and the second electrical connector according to the second embodiment of the present invention.
Figure 10:
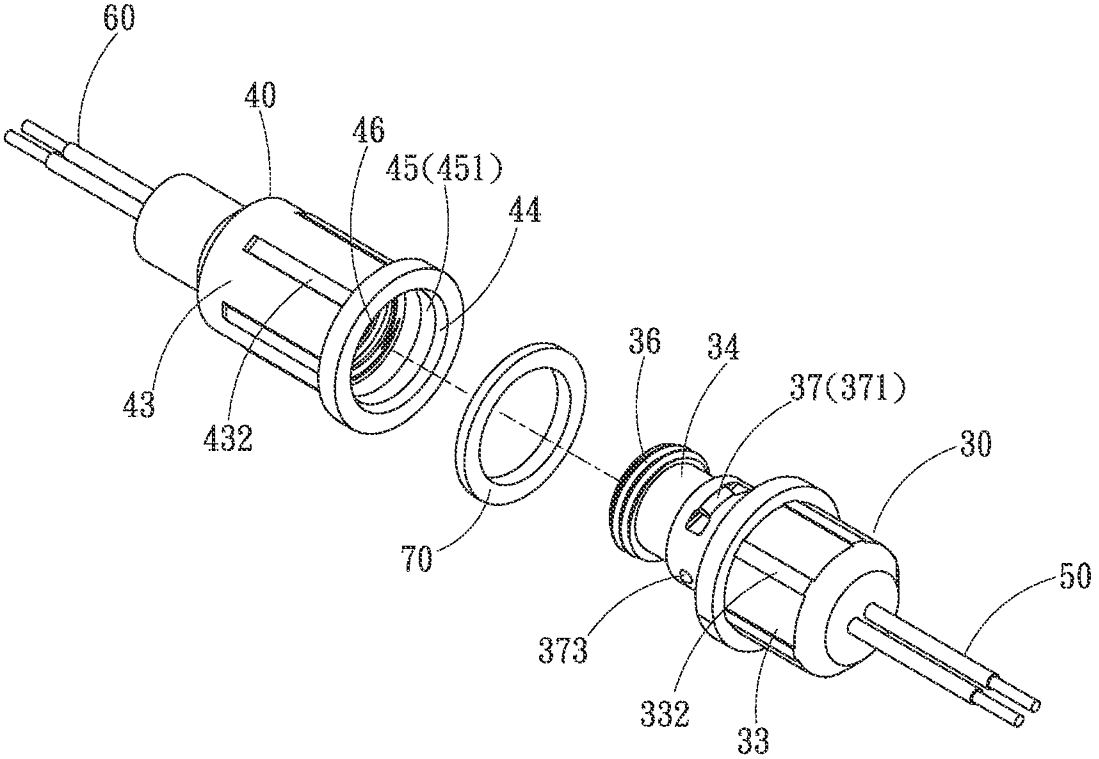
FIG. 10 is an exploded schematic diagram of the first electrical connector and the second electrical connector according to the second embodiment of the present invention.

Referring to FIG. 3, the outer walls of the first connecting post 33 of the first electrical connector 30 and the second connecting post 43 of the second electrical connector 40 of the present invention can be implemented with a plurality of radial protruding rings 331, 431. When the first and second connecting posts 33 and 43 are inserted into the tube bodies of the first and second light poles 10 and 20 respectively, they can be tightly combined with the inner wall of the tube. Referring to FIG. 9 and FIG. 10, the outer walls of the first connecting post 33 and the second connecting post 43 can also be provided with a plurality of axial protrusions 332, 432, which can also be tightly combined with the inner wall of the tube during assembly.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A connection combination structure with free-rotating waterproof lamp conductive module, comprising a first light pole, a second light pole, and a lamp arranged on said first light pole and/or said second light pole, wherein:

said first light pole comprises opposing first end and second end, an axially protruding plug-in post at the first end thereof, a terminal hole recessed at a terminal end of said plug-in post, a first conductive terminal set in said terminal hole, and an external thread portion and at least a first positioning portion provided on an outer circumferential wall of said plug-in post, said plug-in post being a cylinder made of an insulating material;

said second light pole comprises opposing first end and second end, a plug hole axially recessed on the second end thereof, a second conductive terminal set in said plug hole, and a second positioning portion, an internal thread portion and an optical hole portion provided on an inner hole wall of said plug hole sequentially, said plug hole being a round hole made of an insulating material, the diameter of said optical hole portion being larger than the diameter of said internal thread portion and the diameter of said external thread portion; and wherein said plug-in post of said first light pole is inserted into said plug hole of said second light pole, and said first light pole and said second light pole are then rotated to cause said external thread portion to lock into said internal thread portion, and continue the rotation to let said external thread portion pass through said internal thread portion and then enter said optical hole portion, forming that said first light pole and said second light pole are rotatable in the circumferential direction to adjust the illumination direction of said lamp, and said first light pole and said second light pole are prohibited from being pulled apart directly, and thus said first positioning portion and said second positioning portion are locked with each other to form axial positioning, and said first conductive terminal and said second conductive terminal are connected to each other for supplying power to said lamp.

2. The connection combination structure with free-rotating waterproof lamp conductive module as claimed in claim 1, wherein:

said first light pole further comprises a first electrical connector located at the first end thereof, said first electrical connector comprising a first insulator and the said first conductive terminal arranged in said first insulator, said first insulator comprising a first connecting post and the said plug-in post protruding from a front end of said first connecting post, said first connecting post being inserted into the first end of said first light pole, so that said plug-in post protrudes from the first end of said first light pole;

said first conductive terminal has a rear end thereof connected with an electrical wire that extends into said first light pole;

said second light pole further comprises a second electrical connector located at the second end thereof, said second electrical connector comprising a second insulator and the said second conductive terminal arranged in said second insulator, said second insulator comprising a second connecting post and the said plug hole recessed at a front end of said second connecting post, said second connecting post being inserted into the said second end of said second light pole, so that said plug hole is located at the second end of said second light pole;

said second conductive terminal has a rear end thereof connected with an electrical wire that extends into said second light pole.

3. The connection combination structure with free-rotating waterproof lamp conductive module as claimed in claim 2, wherein said first light pole further comprises a second electrical connector located at the second end thereof; said second light pole further comprises a first electrical connector located at the first end thereof.

4. The connection combination structure with free-rotating waterproof lamp conductive module as claimed in claim 2, wherein said first light pole and said second light pole are each a tube body, said first connecting post of said first electrical connector is inserted and fixed at the first end of the tube body of said first light pole, and said second connecting post of said second electrical connector is inserted and fixed at the second end of the tube body of said second light pole.

5. The connection combination structure with free-rotating waterproof lamp conductive module as claimed in claim 4, wherein the front ends of said first connecting post and said second connecting post respectively form a flange, and the said flanges of said first connecting post and said second connecting post are respectively blocked at the front ends of the tube bodies of said first light pole and said second light pole.

6. The connection combination structure with free-rotating waterproof lamp conductive module as claimed in claim 5, wherein said plug-in post is provided with an anti-leakage ring against the front end of said first connecting post, and the said flange at the front end of said first connecting post and the said flange at the front end of said second connecting post clamp said anti-leakage ring.

7. The connection combination structure with free-rotating waterproof lamp conductive module as claimed in claim 1, wherein said first positioning portion is a positioning protrusion protruding from the circumferential surface of said plug-in post and extending along the circumferential direction; said plug-in post is provided with a cavity located below said positioning protrusion so that said positioning protrusion is capable of elastically shrinking and deforming in the radial direction; said second positioning portion is a positioning groove that surrounds the inner hole wall of said plug hole.

8. The connection combination structure with free-rotating waterproof lamp conductive module as claimed in claim 2, wherein said first positioning portion is a positioning protrusion protruding from the circumferential surface of said plug-in post and extending along the circumferential direction; said plug-in post is provided with a cavity located below said positioning protrusion so that said positioning protrusion is capable of elastically shrinking and deforming in the radial direction; said second positioning portion is a positioning groove that surrounds the inner hole wall of said plug hole.

9. The connection combination structure with free-rotating waterproof lamp conductive module as claimed in claim 7, wherein said first positioning portion comprises also comprises a positioning bump protruding from the circumferential surface of said plug-in post.

10. The connection combination structure with free-rotating waterproof lamp conductive module as claimed in claim 8, wherein said first positioning portion comprises also comprises a positioning bump protruding from the circumferential surface of said plug-in post.

11. The connection combination structure with free-rotating waterproof lamp conductive module as claimed in claim 2, wherein said first connecting post and said second connecting post are each selectively provided with a plurality of radial protruding rings or axial protrusions on respective outer walls thereof.

* * * * *